US012711965B2

(12) United States Patent
Adsumilli

(10) Patent No.: US 12,711,965 B2
(45) Date of Patent: Aug. 18, 2026

(54) MULTI-FORMAT SINGLE STREAM SCALABLE CODING FOR MULTI-LANGUAGE AUDIO

(71) Applicant: GOOGLE LLC, Mountain View, CA (US)

(72) Inventor: Balineedu Adsumilli, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 145 days.

(21) Appl. No.: 18/660,657

(22) Filed: May 10, 2024

(65) Prior Publication Data

US 2025/0349300 A1 Nov. 13, 2025

(51) Int. Cl.

| | |
|---|---|
| ***G10L 19/002*** | (2013.01) |
| ***G06F 40/58*** | (2020.01) |
| ***G10L 25/57*** | (2013.01) |

(52) U.S. Cl.

CPC ............ *G10L 19/002* (2013.01); *G06F 40/58* (2020.01); *G10L 25/57* (2013.01)

(58) Field of Classification Search

CPC ........ G10L 19/002; G10L 25/57; G06F 40/58

See application file for complete search history.

(56) References Cited

U.S. PATENT DOCUMENTS

| | | | | |
|---|---|---|---|---|
| 6,931,377 | B1 * | 8/2005 | Seya | H04H 40/18 704/277 |
| 9,571,870 | B1 * | 2/2017 | Wilson | H04N 21/4722 |
| 10,860,648 | B1 * | 12/2020 | McCormick | G10L 15/18 |
| 10,930,263 | B1 * | 2/2021 | Mahyar | G10L 15/16 |

(Continued)

FOREIGN PATENT DOCUMENTS

| | | | | |
|---|---|---|---|---|
| GB | 2635518 A | * | 5/2025 | G10L 19/008 |
| WO | WO-2014207874 A1 | * | 12/2014 | H04H 20/106 |

OTHER PUBLICATIONS

Riedmiller, Jeffrey, et al. "Delivering scalable audio experiences using AC-4." IEEE Transactions on Broadcasting 63.1 (2017): 179-201. (Year: 2017).*

(Continued)

*Primary Examiner* — Brian L Albertalli

(74) *Attorney, Agent, or Firm* — Young Basile Hanlon & 1MacFarlane P.C.

(57) ABSTRACT

Multi-format single stream scalable coding for multi-language audio includes separating background and speech audio of a video stream uploaded to an online video platform and separately encoding the background and speech audio to different coding layers using a scalable video coding schema. During encoding, the background audio is encoded to a base layer bitstream, different language versions of the speech audio are encoded to different enhancement layer bitstreams, and language selection precedence data is embedded to signal to a decoder which of those enhancement layer bitstreams to decode for playback of the video. During decoding, the appropriate enhancement layer bitstream is decoded to obtain speech audio in a desired language, and the base layer bitstream is decoded to obtain the background audio. The background audio and the speech audio are re-mixed into a combined audio stream, which is transmuxed with a video component to produce a media stream for playback.

20 Claims, 9 Drawing Sheets

(56) References Cited

U.S. PATENT DOCUMENTS

| | | | | |
|---|---|---|---|---|
| 11,545,134 | B1 * | 1/2023 | Federico | G10L 13/033 |
| 2007/0106516 | A1 * | 5/2007 | Larson | G11B 27/11 704/E19.048 |
| 2014/0303984 | A1 * | 10/2014 | Johnson | G10L 19/002 704/500 |
| 2016/0021334 | A1 * | 1/2016 | Rossano | G10L 13/033 704/2 |
| 2017/0063960 | A1 | 3/2017 | Stockhammer et al. | |
| 2017/0270968 | A1 | 9/2017 | Johnson et al. | |
| 2019/0132068 | A1 | 5/2019 | Suzuki et al. | |
| 2021/0165973 | A1 * | 6/2021 | Kofman | G06F 40/30 |
| 2022/0165281 | A1 * | 5/2022 | Laaksonen | G06F 40/58 |
| 2023/0298566 | A1 * | 9/2023 | Li | G10L 15/16 704/232 |
| 2024/0211704 | A1 * | 6/2024 | Griffin | G10L 15/26 |
| 2025/0118336 | A1 * | 4/2025 | Di Gangi | G10L 13/10 |

OTHER PUBLICATIONS

Kjörling et al.; “AC-4—The Next Generation Audio Codec”; Jun. 4-7, 2016; 10 pages.

Perez; “YouTube launches a multi-language audio feature for dubbing videos, previously tested by MrBeast”; Feb. 23, 2023; 11 pages.

Binder; “YouTube rolls out dubbed video feature for creators to upload multi-language audio tracks; Subs or Dubs? Now you can have both on YouTube. ”; https://in.mashable.com/tech/47842/youtube-rolls-out-d ubbed-video-feature-for-creators-to-upload-multi-languag e-audio-tracks; Feb. 23, 2023; 13 pages.

Mohamed et al.; “Enhanced multiple speaker’s separation and identification for voip applications using deep learning”; https://www.mdpi.com/2076-3417/13/7/4261; Mar. 2023; 11 pages.

* cited by examiner

MULTI-FORMAT SINGLE STREAM SCALABLE CODING FOR MULTI-LANGUAGE AUDIO

BACKGROUND

Digital video streams may represent video using a sequence of frames or still images. Digital video can be used for various applications including, for example, video conferencing, high-definition video entertainment, video advertisements, or sharing of user generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

Disclosed herein are, inter alia, systems and techniques for multi-format single stream scalable coding for multi-language audio.

A method according to an implementation of this disclosure comprises: separating audio of an input video stream uploaded to an online video platform into background audio and speech audio; converting the speech audio into multiple language speech audio versions; encoding the background audio to a base layer bitstream; encoding each of the multiple language speech audio versions to a different enhancement layer bitstream; combining, into an encoded audio stream, the base layer bitstream, each of the enhancement layer bitstreams, and language selection precedence data for the enhancement layer bitstreams; and outputting the encoded audio stream for storage or further processing.

A method according to another implementation of this disclosure comprises: obtaining an encoded audio stream including a base layer bitstream, multiple enhancement layer bitstreams each corresponding to a different language version of speech audio, and language selection precedence data; decoding, from the audio stream, the base layer bitstream into background audio; decoding, from the audio stream, an enhancement layer bitstream indicated by the language selection precedence data into speech audio; remixing the background audio and the speech audio into an audio stream; combining the audio stream and a video stream into a single media stream; and outputting the single media stream for playback or further processing.

A system according to yet another implementation of this disclosure comprises: one or more servers used with an online video platform and configured to: obtain an input video stream from a first device; encode background audio of the input video stream to a base layer bitstream; encode each of multiple language versions of speech audio of the input video stream to a different enhancement layer bitstream; combine, into an encoded audio stream, the base layer bitstream, each of the enhancement layer bitstreams, and language selection precedence data for the enhancement layer bitstreams; and output the encoded audio stream for decoding at a second device responsive to a playback request for a video associated with the encoded audio stream, wherein the encoded audio stream configures the second device to decode one of the enhancement layer bitstreams for playback of a language version of the speech audio along with the background audio according to the language selection precedence data.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
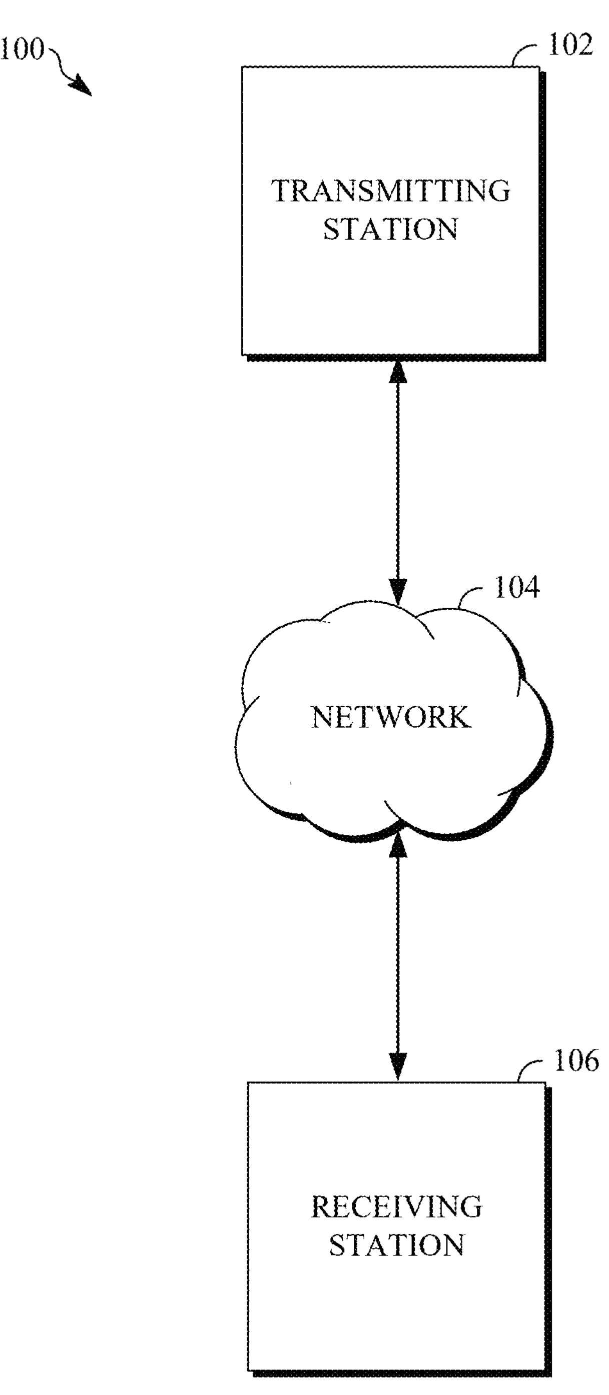
FIG. 1 is a schematic of an example of a video platform system.

Online video platforms, such as YouTube, process input video streams uploaded to them for hosting and later on-demand viewing at playback devices. Because users of an online video platform may speak different languages, it is important that videos be available for playback via the online video platform in various languages. Typically, to enable playback of a video in multiple languages, a content creator who uploads an input video stream to an online video platform must themselves provide complete audio tracks for each language other than the default one used within the input video stream. The online video platform may then, upon request from a playback device during playback of a video, switch between ones of those audio tracks to provide different audio language output to the playback device.

In particular, a conventional approach may include the online video platform separating the audio and video components of the input video stream and transmitting individual audio language tracks to a playback device one at a time to enable a rendering engine at the playback device to reconstruct and match a provided audio language track to the video component. Thus, where a user viewing a video wants to change the audio language after the playback has begun, the online video platform must terminate transmission of a first audio language track and initiate transmission of a second audio language track to the playback device. The rendering engine at the playback device receives the second audio language track as a new audio stream and reconstructs the audio therefrom for matching to the video component.

However, these conventional approaches suffer from material drawbacks in that they substantially increase the egress costs, network latency, and track management overhead required for video hosting and playback. The processing servers used with the online video platform incur egress costs and overhead when maintaining and transmitting the various separate language audio tracks, especially when considering that the audio of an input video stream usually includes background (e.g., non-speech and/or certain non-diegetic speech) components which must be replicated in each of the language audio tracks. Hence, much of these contents are redundant and so the maintenance of separate copies thereof is both redundant and sub-optimal. These approaches also typically result in significant quality loss for playback device users due to buffering and audio-visual synchronization issues, which are likely given the lack of transmuxing of such audio-visual data at the processing servers. They may also introduce computational and battery strain on the playback device caused by the requirement to perform on-the-fly rendering changes.

Implementations of this disclosure address problems such as these using multi-format single stream scalable coding for multi-language audio. A framework is disclosed for efficiently encoding multiple audio language tracks into a single bitstream using scalable encoding, thereby reducing storage and network transmission bandwidth costs for multi-language videos stored at an online video platform. A scalable video coding schema is used to split an input video stream obtained for encoding by an online video platform into a base layer and various enhancement layers each corresponding to a different language version of speech audio of the input video stream, in which the base layer can be decoded independent of the enhancement layers. In particular, audio of the input video stream is separated into background audio and speech audio, and the speech audio is then converted into each of multiple language versions. A single encoded audio stream is then produced by combining a base layer bitstream to which background audio is encoded and various enhancement layer bitstreams to which individual ones of the multiple language versions of the speech audio are encoded.

The single encoded audio stream thus includes all language tracks of the input video stream in a compressed format, thus resulting in significantly reduced egress and storage bandwidth compared to conventional approaches for separately encoding each individual audio language track. The implementations of this disclosure thus provide a flexible approach to enabling the independent decoding of audio of a preferred language without incurring the overhead of latency, computational expense, or network bandwidth incurred with conventional approaches to streaming video using multiple language versions. In one particular example, given that background audio may account for a majority of audio in a typical video, with speech instead accounting for a smaller amount thereof, the approaches disclosed herein may materially decrease the size of the language audio tracks used by reducing the duplicative background contents otherwise replicated across them. Moreover, the implementations of this disclosure provide improvements to experiences of both content creators and playback device users. For example, they enable playback device users to use multi-language without on-the-fly transmuxing during playback, thereby preserving device processing cost and even battery life. In another example, they alleviate content creator complexities required by typical video upload workflows by introducing tools for automated or semi-automated audio source separation and language conversion, thereby taking the translation burden away from the content creator.

Further details of techniques for multi-format single stream scalable coding for multi-language audio are described herein with initial reference to a system in which such techniques can be implemented. FIG. 1 is a schematic of an example of a video platform system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for the uploading, processing, and/or viewing of a video stream. Specifically, the video stream can be uploaded from the transmitting station 102 and viewed at the receiving station 106 after processing. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
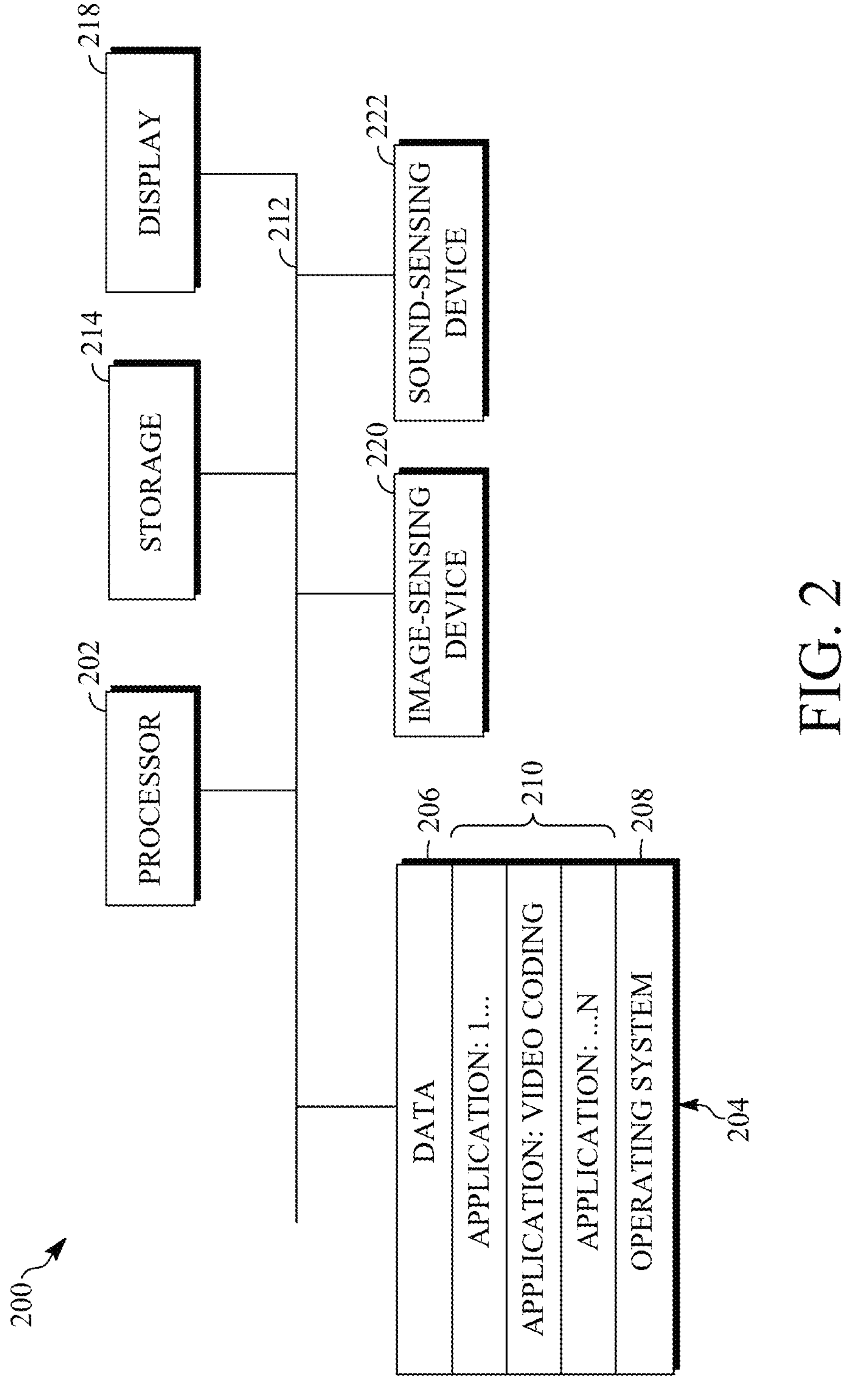
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video platform system 100 are possible. For example, an implementation can omit the network 104. In another implementation, a video stream can be uploaded from the transmitting station 102 and then stored for transmission at a later time to the receiving station 106 or any other device having memory. In one implementation, the receiving station 106 receives (e.g., via the network 104, a computer bus, and/or some communication pathway) and stores the processed video stream for later viewing. In an example implementation, a real-time transport protocol (RTP) is used for transmission of the processed video over the network 104. In another implementation, a transport protocol other than RTP may be used (e.g., a Hypertext Transfer Protocol-based (HTTP-based) video streaming protocol).

In some cases, the transmitting station 102 may be a device of a video uploader and the receiving station 106 may be a server of an online video platform. In some cases, the transmitting station 102 may be a server of an online video platform and the receiving station 106 may be a device of a person viewing videos at the online video platform. In some cases, the transmitting station 102 may be a device of a video uploader and the receiving station 106 may be a device of a person viewing videos at an online video platform, such as where a server of the online video platform is intermediary thereto.

FIG. 2 is a block diagram of an example of a computing device 200 that can implement a transmitting station or a receiving station. For example, a computing device such as the computing device 200 can implement the transmitting station 102 and/or the receiving station 106 shown in FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which include a video coding application that performs some or all of the techniques disclosed herein.

The computing device 200 can also include a secondary storage 214, which can, for example, be a memory card used with a mobile computing device. Because video may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. For example, the operations of the processor 202 can be distributed across multiple machines (wherein individual machines can have one or more processors) that can be coupled directly or across a local area or other network. In another example, the memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
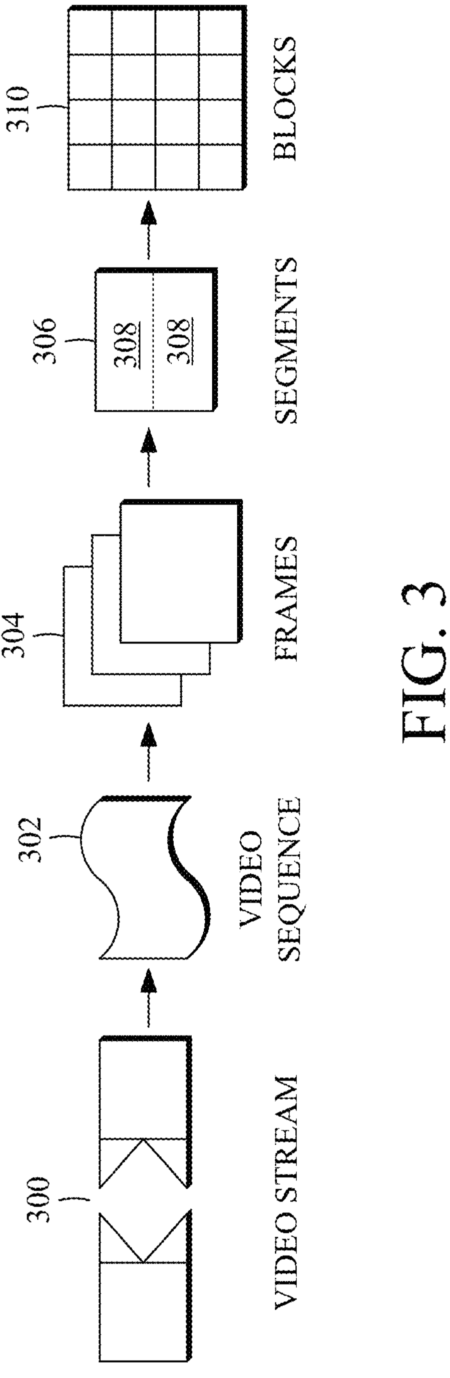
FIG. 3 is a diagram of an example of a video stream which may be uploaded to and processed at an online video platform.

FIG. 3 is a diagram of an example of a video stream 300 which may be uploaded to and processed at an online video platform. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
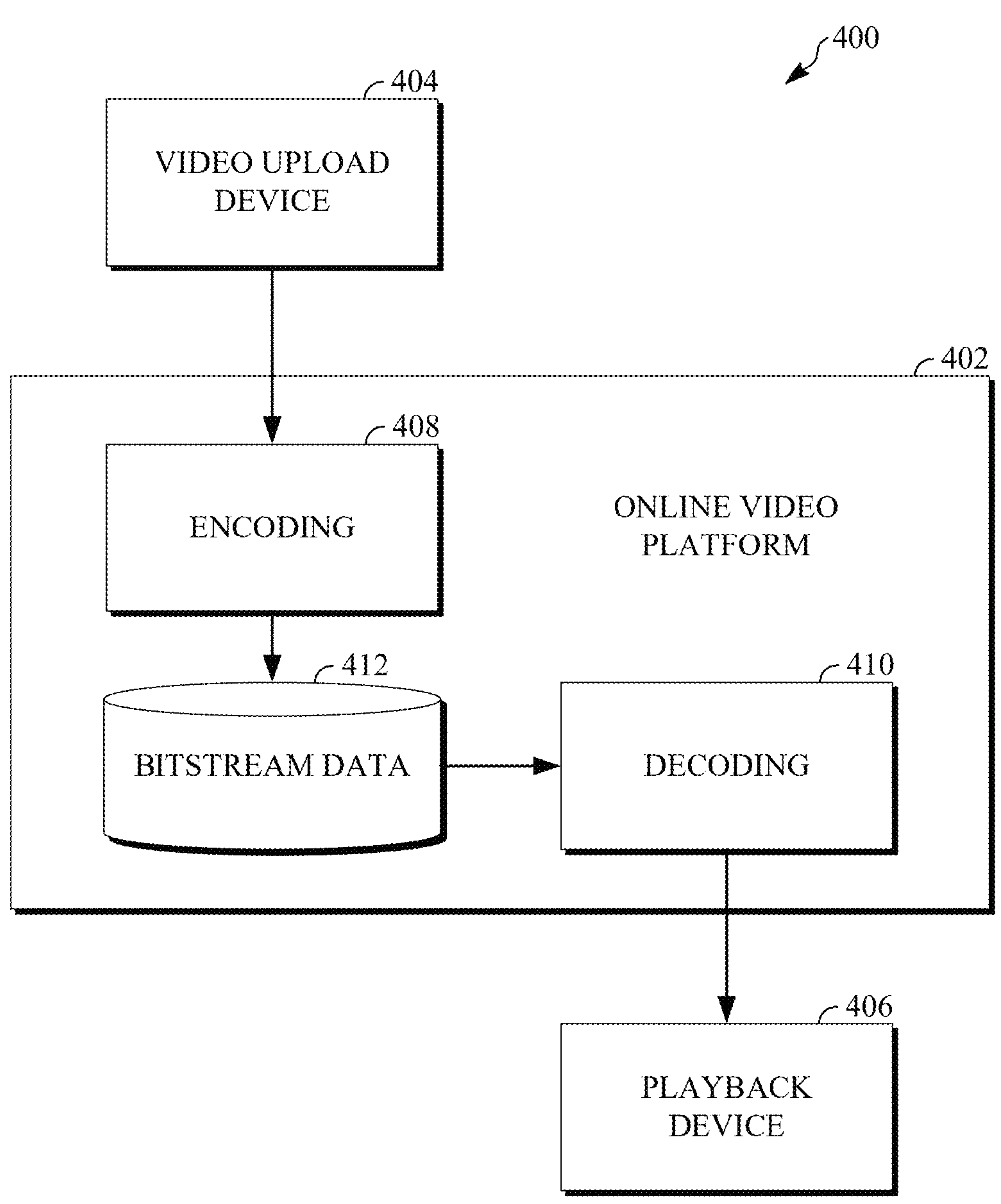
FIG. 4 is a block diagram of an example of a multi-language audio system for encoding and decoding videos.

FIG. 4 is a block diagram of an example of a multi-language audio system 400 for encoding and decoding videos. The multi-language audio system 400 can be implemented in a server (or multiple servers) of an online video platform 402, such as by providing a computer software program stored in memory, for example, the memory 204 shown in FIG. 2. The computer software program can include machine instructions that, when executed by a processor such as the processor 202 shown in FIG. 2, cause the server(s) to process audio and video components of an input video stream (e.g., the video stream 300 shown in FIG. 3) obtained from a video upload device 404 and to later provide the processed video and audio to a playback device 406 for playback.

The online video platform includes an encoding stage 408 and a decoding stage 410. The encoding stage 408 and the decoding stage 410 may be implemented at the same one or more servers. Alternatively, the one or more servers used to implement the encoding stage 408 may be different from the one or more servers used to implement the decoding stage 410. The encoding stage 408 obtains an input video stream from the video upload device 404, which may, for example, be a computing device such as a mobile phone, tablet computer, laptop computer, or desktop computer. The encoding stage 408 processes the input video stream to produce an encoded audio stream that includes a base layer bitstream representing background audio of the input video stream and multiple enhancement layer bitstreams each representing a different language version of speech audio of the audio of the input video stream. The encoding stage 408 outputs the encoded audio stream to a bitstream data store 412 for storage or further processing, for example, alongside an encoded video stream representing the video component of the input video stream. Implementations and examples of processing performed by the encoding stage 408 are further described with respect to FIG. 5.

The decoding stage 408 obtains the encoded audio stream from the bitstream data store 412. The decoding stage 408 then decodes, from the encoded audio stream, the base layer bitstream and an enhancement layer bitstream representing a certain language version of the speech audio and combines the decoded base layer and enhancement layer bitstreams to prepare same for transmuxing with a decoded video component. The decoding stage 408 then outputs the transmuxed audio-visual media to the playback device 406 for rendering. The decoding stage 408 is further configured to, responsive to a selection of a language other than the language of the decoded enhancement layer bitstream, decode a different enhancement layer bitstream from the encoded audio stream and prepare same for playback (e.g., by combining the speech audio decoded within the language of the different enhancement layer bitstream with the background audio decoded from the base layer bitstream) within a next video chunk of the video component). Implementations and examples of processing performed by the decoding stage 410 are further described with respect to FIG. 6.

Figure 5:
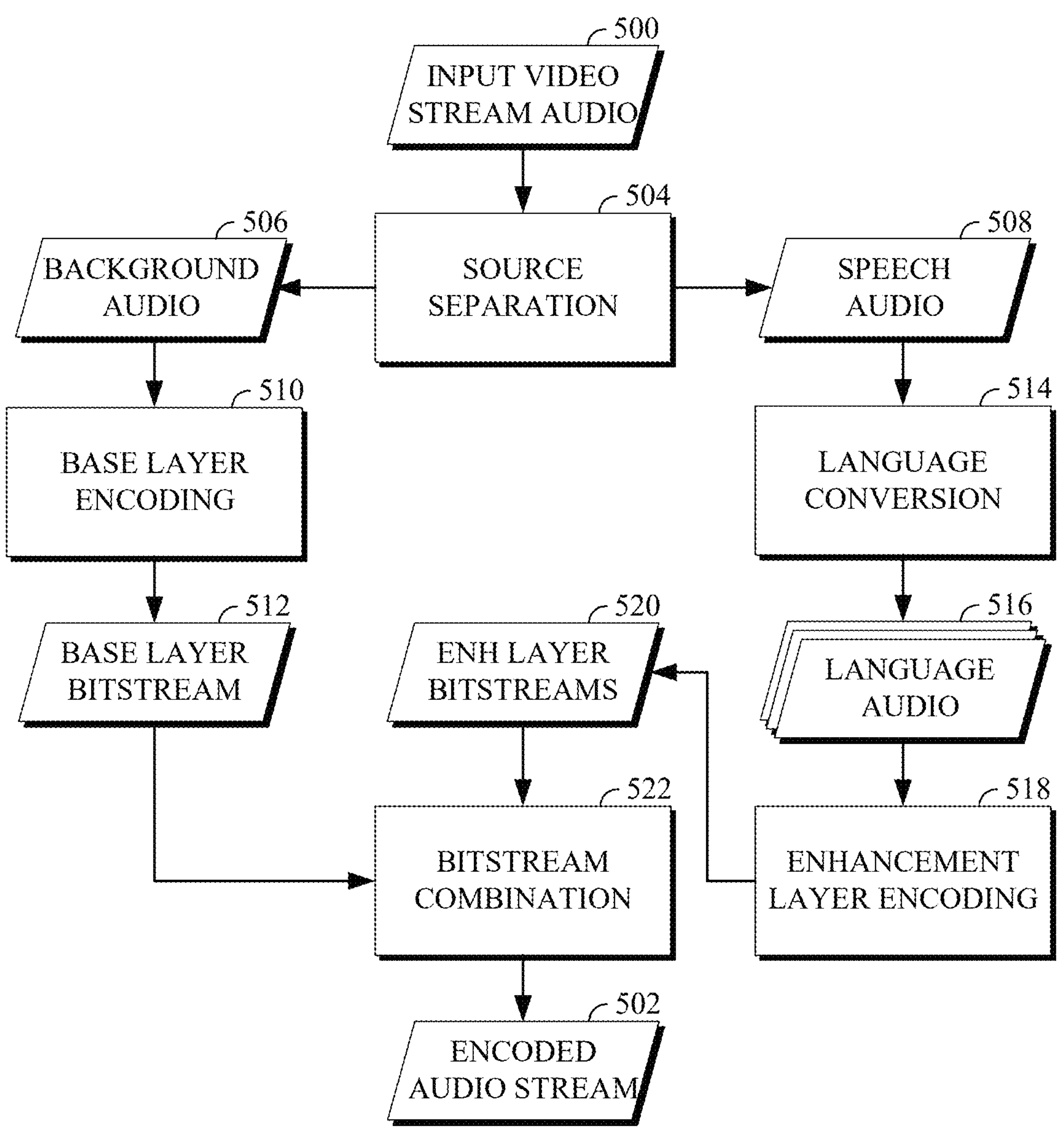
FIG. 5 is a block diagram of an example of an encoding stage of a multi-language audio system.

FIG. 5 is a block diagram of an example of an encoding stage of a multi-language audio system, for example, the encoding stage 408 of the multi-language audio system 400 shown in FIG. 4. The encoding stage takes, as input, audio 500 of an input video stream (e.g., uploaded to an online video platform from a video upload device, such as the video upload device 404 shown in FIG. 4). The encoding stage produces, as output, an encoded audio stream 502 as a single bitstream that includes background audio of the audio 500 as well as speech audio of the audio 500 in each of multiple languages.

The encoding stage includes a source separation tool 504 that separates background audio 506 and speech audio 508 from the audio 500, a base layer encoding tool 510 that encodes the background audio 506 to a base layer bitstream 512, a language conversion tool 514 that converts the speech audio 508 into language audio 516 multiple language versions of the speech audio 508, and enhancement layer encoding tool 518 that encodes the language audio 516 (i.e., each of the multiple language versions of the speech audio 508) to enhancement layer bitstreams 520 each corresponding to a different one of the languages represented by the language audio 516, and a bitstream combination tool 522 that combines the base layer bitstream 512 and the enhancement layer bitstreams 520 into the encoded audio stream 502.

The source separation tool 504 separates the background audio 506 and the speech audio 508 to enable the separate encoding of the background audio 506 and the speech audio 508 (i.e., by the base layer encoding tool 510 and the enhancement layer encoding tool 518, respectively), thereby preventing duplication of the background audio 506 in the encodings of various eventual language versions the speech audio 508.

The background audio 506 generally refers to audio contents of the audio 500 that are in the background (e.g., ambient). Non-limiting examples of the background audio 506 include environmental noises (e.g., birds chirping or wind blowing), noises from some form of action (e.g., doors closing or action sequence explosions), and music. The background audio 506 will typically not include any speech; however, in some cases, the background audio may include diegetic or non-diegetic background speech audio. Diegetic background speech audio includes speech having a visually detectable background source. For example, speech from a movie character within a movie scene being watched by people appearing in a video would be considered diegetic background speech audio since the movie scene is merely playing while the video is being captured, while speech from those people would not be considered background speech. Non-diegetic background speech audio includes speech not having a visually detectable background source. In another example, speech from music playing in the background of a video, and thus which does not have a visually detectable source, would be considered non-diegetic background speech audio, while speech from a narrator describing a current scene or character of a video would not be considered background speech.

The speech audio 508 generally refers to audio contents of the audio 500 that are or include speech in one or more spoken human languages. Non-limiting examples of the speech audio 508 include dialog between two or more people, a lecture (e.g., a presentation or monologue) or other spoken phrase or aspect by a single person, narration by one or more people, and chants from a crowd. The speech audio 508 may at times include multiple people speaking over one another or otherwise at the same time. The speech audio 508 may thus include diegetic speech audio and/or non-diegetic speech audio, in which diegetic speech audio includes speech having a visually detectable source and non-diegetic speech audio includes speech not having a visually detectable source.

The source separation tool 504 performs blind audio source separation against the audio 500 to separate the audio 500 into the background audio 506 and the speech audio 508. The source separation tool 504 can perform the blind audio source separation in one or more ways. In one example, the blind audio source separation can include the source separation tool 504 using filters to separate contents of the audio 500 according to frequencies thereof recognized as corresponding to aspects such as acoustic or linguistic patterns. In another example, the blind audio source separation can include the source separation tool 504 using a machine learning model (e.g., a neural network or deep learning network) trained for speech and speaker identification to perform the blind audio source separation. For example, the machine learning model can output, for a given speech content, a tuple indicating the speech, a probability that the speech is a predominant speech at the time spoken during the input video stream, and audio other than that speech. In some cases, such as where multiple speakers are speaking simultaneously during some or all of the audio 500, the blind audio source separation can include the source separation tool 504 first separating the background audio 506 from the audio 500 and then separating the speech of the multiple speakers. Thus, multitudes of speech signals may be separated and processed in parallel.

The base layer encoding tool 510 encodes the background audio 506 to the base layer bitstream 512. The base layer encoding tool 510 encodes the background audio 506 to the base layer bitstream 512 using a scalable video coding schema that enables a split of contents across base and enhancement layers, in which the base layer includes data that can be decoded (e.g., reconstructed) and played back independent of data encoded to an enhancement layer, and in which the base layer can be appended by one or more separately decodable enhancement layers that add to the base layer. The base layer bitstream 512 may be encoded using one of various audio media formats, for example, via the enhanced audio codec (EAC), the immersive audio media format (IAMF), or the like. The base layer encoding tool 510 may encode the background audio 506 to the base layer bitstream 512 in a default or selected audio channel, for example, one of mono, stereo, or surround.

The language conversion tool 514 converts the speech audio 508 from an original language (i.e., in a language of the speech as captured in the input video stream) to each of multiple other languages, represented as language audio 516. The language audio 516 thus includes different language versions of the speech audio 508 and may be referred to as different audio language tracks of the speech audio 508. The number of other languages into which the language conversion tool 514 converts the speech audio 508, and thus the number of versions in the language audio 516, may be set or otherwise defined based on capabilities of an online video platform using the encoding stage or of another computing aspect, but in any event is not limited based on the implementations of this disclosure.

The language conversion tool 514 may convert the speech audio 508 into the language audio 516 in one or more ways. In one example, the speech audio 508 may be converted by a semi-automated process by which the speech audio 508 is converted into text, the text is processed (e.g., cleaned up, such as to remove conversion artifacts or like errors) and translated into a different language, and the translated text is converted to speech as one of the language audio 516 elements. In some such cases, the translated text may optionally be presented for manual user review and refinement (e.g., to the user of the video upload device) before it is converted to speech as one of the language audio 516 elements. In another example, the speech audio 508 may be converted by an automated process by which the speech audio 508 is converted directly into speech in a different language as represented by one of the language audio 516 elements using a machine learning model trained for language conversion, such as a large language model. In such a case, the speech audio 508 conversion is performed without an intermediate text conversion.

In some cases, a semi-automated process performed by the language conversion tool 514 may use a predefined voice model or a voice model trained a priori. For example, a voice model may be trained for a given speaker's voice, and thus based on contents derived from the speech audio 508, for the text-to-speech conversion. In this way, the language audio 516 may be produced using a voice matching or at least similar (e.g., in speech modulation and emotional conveyance) to that of the original speaker as in the speech audio 508. In some cases, the speech audio 508 may be converted by a manual dubbing process by which a device user (e.g., a user of the video upload device from which the input video stream is obtained) provides the language audio 516 either directly (i.e., from their device) or indirectly (e.g., from an intermediary software or system, such as an external software tool used for audio dubbing or translation).

The enhancement layer encoding tool 518 encodes the language audio 516 to the enhancement layer bitstreams 520. In particular, the enhancement layer encoding tool 518 encodes each of the language audio 516 elements (i.e., each of the audio language tracks of the speech audio 508) to a different enhancement layer bitstream 520. As such, the number of the enhancement layer bitstreams will correspond to the number of the language audio 516 elements. The enhancement layer encoding tool 518 encodes the language audio 516 to the enhancement layer bitstreams 520 using the same scalable video coding schema as the base layer encoding tool 510 uses to encode the background audio 506 to the base layer bitstream 512. Thus, the enhancement layer bitstreams 520 will generally be in the same audio media format as the base layer bitstream 512. The enhancement layer encoding tool 518 encodes the language audio 516 to the enhancement layer bitstreams 520 in a default or selected audio channel, for example, one of mono, stereo, or surround. In some cases, the audio channel used for the language audio 516 may be different from the audio channel used for the background audio 506. For example, the background audio 506 may be encoded to the base layer bitstream using a first audio channel format (e.g., stereo) while the language audio 516 may be encoded to the enhancement layer bitstreams using a second audio channel format (e.g., 5.1 surround sound).

The bitstream combination tool 522 combines the base layer bitstream 512 and each of the enhancement layer bitstreams 520 into the encoded audio stream 502. The encoded audio stream 502 thus includes an encoded representation of each of the background audio 506 and the various language audio 516. The bitstream combination tool 522 also embeds language selection precedence data for the enhancement layer bitstreams 520. The language selection precedence data is information usable to determine, during decoding of the encoded audio stream 502 and thus for playback of the input video stream at a playback device, an audio language track to use for the playback and thus which of the enhancement layer bitstreams 520 to decode.

The language selection precedence data may, for example, be or include a table of precedence within which predefined language indicators are used to indicate prioritizations of audio language tracks corresponding to the various enhancement layer bitstreams 520. For example, the language indicators may be arranged in a sequence starting with a default audio language track to use for the playback of the input video stream (e.g., the language in which the speech audio 508 is originally captured) and including other prioritized and/or non-prioritized audio language tracks. In some cases, the prioritization of the language indicators, and thus of the enhancement layer bitstreams 520, may be defined by a user of the online video platform.

The language selection precedence data may be encoded as metadata used with the encoded audio stream 502 or as supplemental enhancement information encoded within the encoded audio stream 502. Where the language selection precedence data is metadata, the bitstream combination tool 522 embeds the metadata as bits transmitted as overhead along with the encoded audio stream 502. Where the language selection precedence data is supplemental enhancement information, the bitstream combination tool 522 embeds the supplemental enhancement information as an N-bit binary signal within a header of the encoded audio stream. For example, the header may be a header of the base layer bitstream 512.

The encoded audio stream 502, upon production by the bitstream combination tool 522, may then be stored (e.g., in the bitstream data store 412 shown in FIG. 4) for later access upon a request for the video with which the encoded audio stream 502 corresponds.

Figure 6:
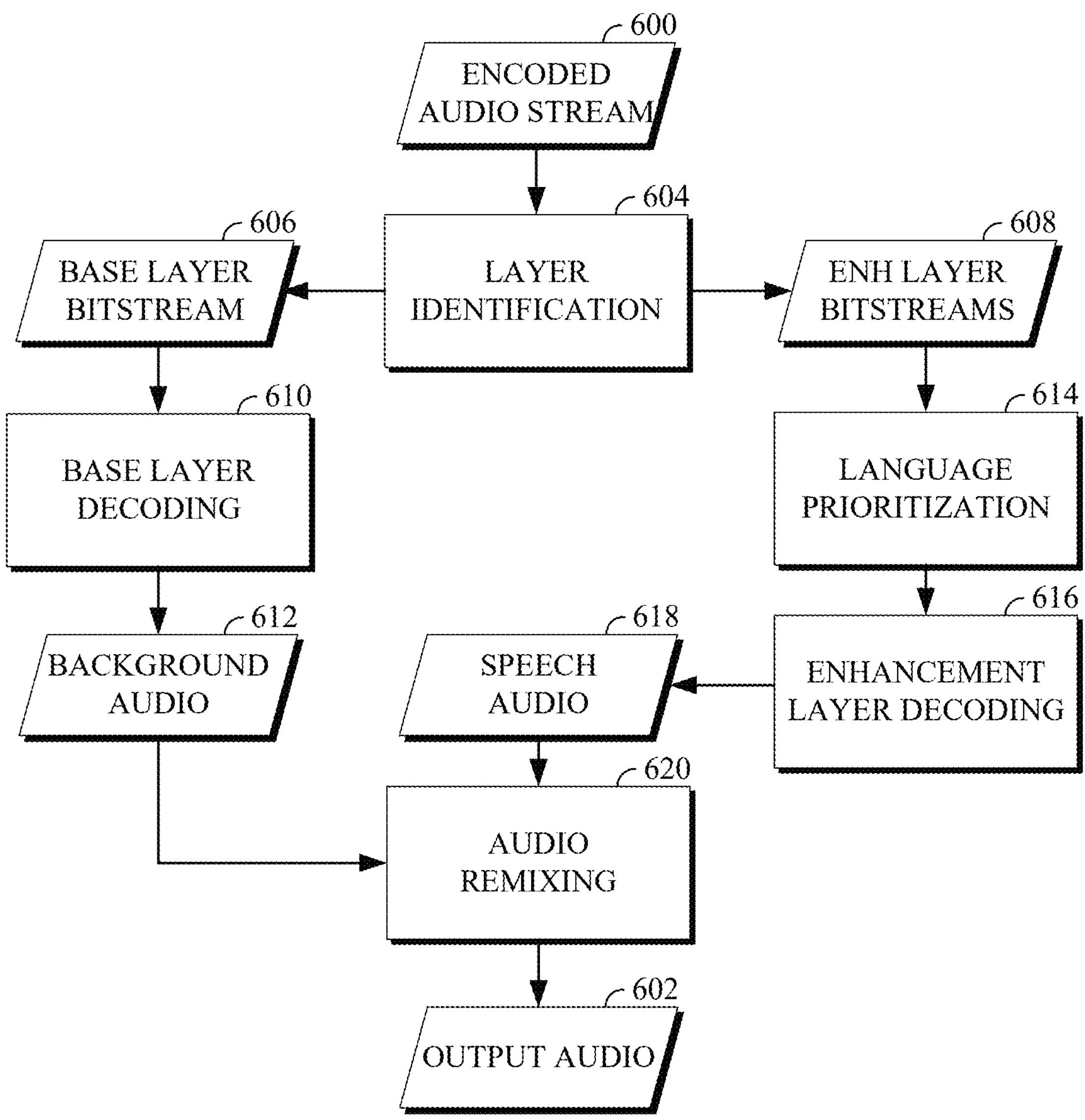
FIG. 6 is a block diagram of an example of a decoding stage of a multi-language audio system.

FIG. 6 is a block diagram of an example of a decoding stage of a multi-language audio system, for example, the decoding stage 410 of the multi-language audio system 400 shown in FIG. 4. The decoding stage takes, as input, an encoded audio stream 600 as a single bitstream that includes background audio as well as corresponding speech audio in each of multiple languages. The decoding stage produces, as output, output audio 602 representing a single audio output stream produced by combining (e.g., re-mixing) the reconstructed background audio and speech audio in a determined language.

The decoding stage includes a layer identification tool 604 that identifies a base layer bitstream 606 and enhancement layer bitstreams 608 included in the encoded audio stream 600, a base layer decoding tool 510 that decodes the base layer bitstream into background audio 612, a language prioritization tool 614 that determines a prioritized language to use for playback within the output audio 602, an enhancement layer decoding tool 616 that decodes an enhancement layer bitstream associated with the prioritized language into speech audio 618, and an audio remixing tool 620 that re-mixes the background audio 612 and the speech audio 618 into an audio stream that is then output as the output audio 602.

The layer identification tool 604 identifies the base layer and enhancement layer contents of the encoded audio stream 600 as a base layer bitstream 606 and enhancement layer bitstreams 608. For example, the layer identification tool 604 may parse a header of the encoded audio stream, in which the header is formatted according to a scalable video coding schema used to produce the encoded audio stream 600, to identify locations of the base layer and enhancement layer contents within the encoded audio stream 600.

The base layer decoding tool 610 decodes the base layer bitstream 606 from the encoded audio stream 600, according to the identification by the layer identification tool 604, into background audio 612. The background audio 612 is the primary source of non-speech audio that will be used within the output audio 602.

The language prioritization tool 614 determines an enhancement layer bitstream 608 to decode according to language selection precedence data of the encoded audio stream 600. In particular, the language prioritization tool 614 parses an N-bit binary signal of the encoded audio stream 600 to obtain (e.g., decode) the language selection precedence data, which, as described above, may be or include a table of precedence within which predefined language indicators are used to indicate prioritizations of audio language tracks corresponding to the various enhancement layer bitstreams 608. The language selection precedence data (and thus the N-bit binary signal) may be embedded within a header of the encoded audio stream 600, for example, as supplemental enhancement information, or, alternatively, as metadata associated with the encoded audio stream 600.

The language selection precedence data is parsed to identify a prioritized audio language track for speech audio to use within the output audio 602. The prioritized audio language track refers to a language indicated as the default language for speech audio playback or a user-preferred language therefor. For example, a default language may be indicated within the language selection precedence data as either the original language that speech audio was captured in when the subject input video stream under decoding was captured or as another language selected by the device user who uploaded the input video stream to an online video platform. However, a user of a playback device requesting to view the subject video may have their own language preferences. In one example, playback device user language preferences may be determined based on information associated with an online video platform user account of the playback device user. For example, the user account may indicate a preferred language for that user viewing videos of the online video platform. Where such a user-preferred language is discernible (e.g., available), the language selection precedence data may indicate the user-preferred language and thus an enhancement layer bitstream 608 corresponding thereto as the prioritized audio language track. However, where such a user-preferred language is indiscernible (e.g., unavailable), the language selection precedence data may indicate a default or video uploader-selected language and thus an enhancement layer bitstream 608 corresponding thereto as the prioritized audio language track. In some cases, multiple languages may be indicated in a priority order to enable each corresponding enhancement layer bitstream 608 to be identified and decoded for ease of switching during playback of the output audio 602.

The enhancement layer decoding tool 616 decodes the enhancement layer bitstream 608 indicated by the language selection precedence data, and thus determined by the language prioritization tool 614, into speech audio 618. The enhancement layer decoding tool 616 decodes at least one enhancement layer bitstream, and, thus, in some cases, may decode multiple enhancement layer bitstreams. For example, the enhancement layer decoding tool 616 may decode a first enhancement layer bitstream associated with a default language for the subject video and a second enhancement layer bitstream associated with a user-preferred language. In some cases, the enhancement layer decoding tool 616 may decode all of the enhancement layer bitstreams 608 for availability of selection during later playback of the output audio 602. In some such cases, speech audio in one or more unused languages as decoded from one or more corresponding enhancement layer bitstreams may be culled during playback of the output audio 602 in the event of a network issue affecting the connection of the playback device to the processing server of the online video platform from which the speech audio is transmitted.

The audio remixing tool 620 re-mixes the background audio 612 and the speech audio 618 into the output audio 602, as an audio stream to be combined (e.g., transmuxed) with a video stream into a single media stream which may then be output for playback or further processing. In particular, the output audio 602 may be transmuxed with a video component to result in an output video stream that may be transmitted to a playback device (e.g., the playback device 404 shown in FIG. 4) for rendering.

Because the enhancement layer bitstreams, and thus the corresponding language versions of the speech audio 618, are all of approximately the same length and the beginnings thereof are temporally aligned. As such, timestamp information is not necessary; rather, should the playback device user seek to change languages during playback of the subject video, a new speech audio can replace the previous speech audio at a time of the language change. Alternatively, chunk-to-chunk or scene-to-scene timestamps may be used to match the lengths of each segment of the speech audio 618 to the corresponding context of the background audio 612. For example, a chunk-based approach may instead be used to switch between enhancement layers to allow users to switch playback between languages while streaming a given video. This is easy for the rendering engine at the playback device to do since it already has the applicable language tracks and simply receives an instruction to begin decoding a different enhancement layer bitstream at a certain time. In such a case, the rendering engine at the playback device may stop decoding the current enhancement layer bitstream and begins decoding the new enhancement layer bitstream at that time.

Figure 7:
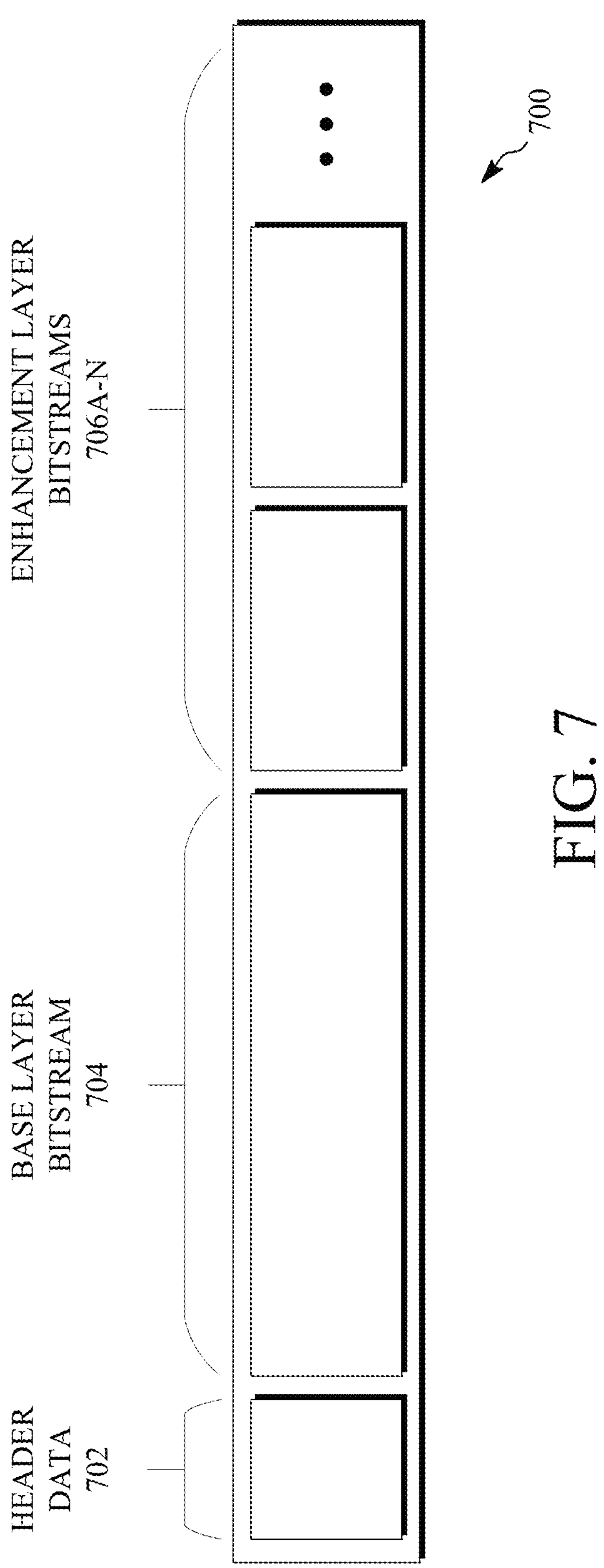
FIG. 7 is an illustration of an encoded audio stream produced and processed by a multi-language audio system.

FIG. 7 is an illustration of an encoded audio stream 700 produced and processed by a multi-language audio system, for example, the multi-language audio stream 400 shown in FIG. 4, such as according to the encoding and decoding shown and described with respect to FIGS. 5 and 6. The encoded audio stream 700, which may, for example, be the encoded audio stream 502 shown in FIG. 5 and/or the encoded audio stream 600 shown in FIG. 6, is an encoded bitstream into which various audio data is combined. In particular, the encoded audio stream 700 includes header data 702, a base layer bitstream 704, and enhancement layer bitstreams 706A through N. The base layer bitstream 704, which may, for example, be the base layer bitstream 512 shown in FIG. 5 and/or the base layer bitstream 606 shown in FIG. 6, encodes background audio of an input video stream. Each of the enhancement layer bitstreams 706A through N, which may, for example, be the enhancement layer bitstreams 620 shown in FIG. 5 and/or the enhancement layer bitstreams 608 shown in FIG. 6, encodes a different language version of speech audio of the input video stream. The header data 702 includes information which may be used to decode and thus reconstruct the contents represented by the base layer bitstream 704 and one or more of the enhancement layer bitstreams 706A through N. For example, the header data 702 may include language selection precedence data (e.g., expressed as supplemental enhancement information) usable to determine a priority language for the speech audio, which is thus usable to identify and select a corresponding enhancement layer bitstream to decode.

Figure 8:
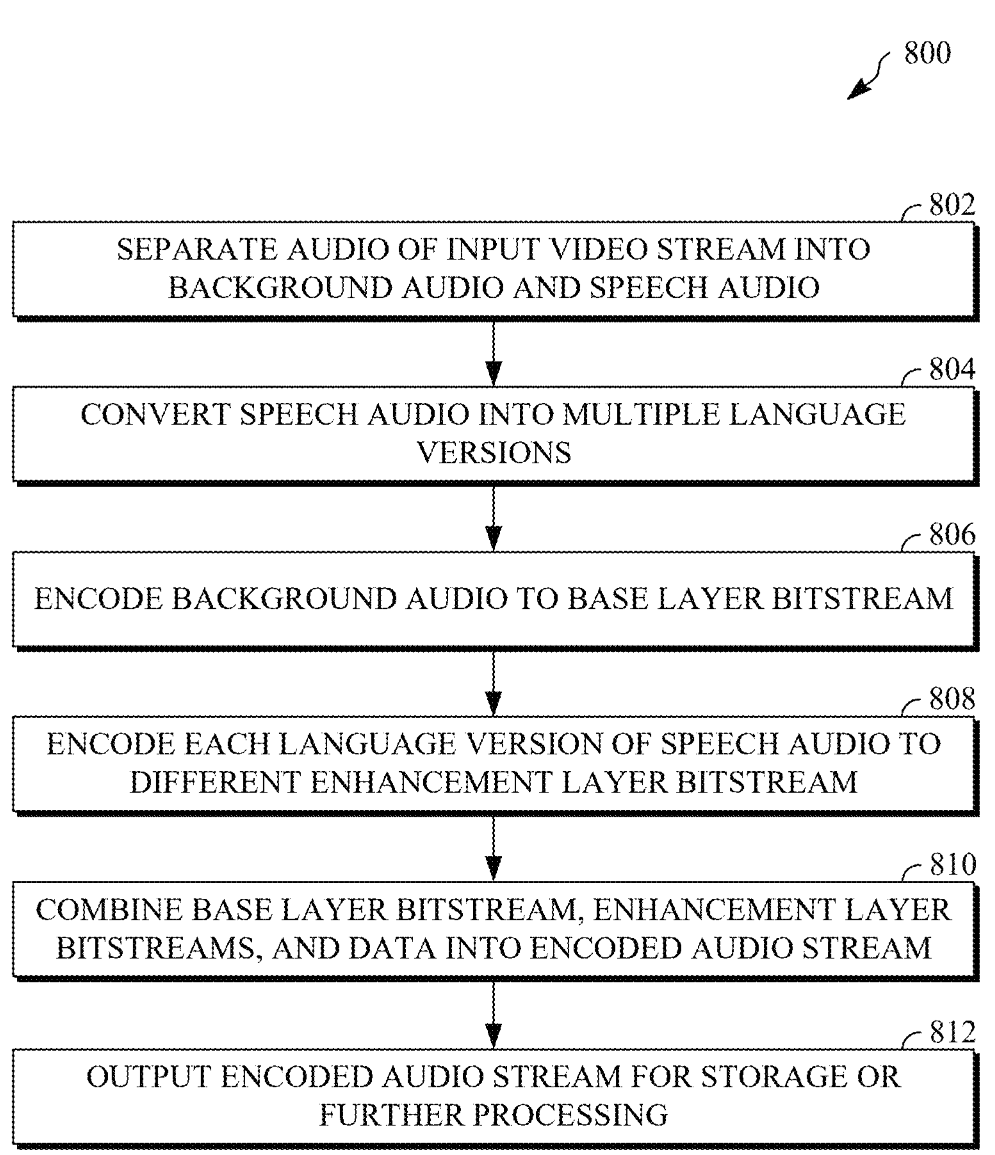
FIG. 8 is a flowchart diagram of an example of a technique for multi-format single stream scalable encoding for multi-language audio.
Figure 9:
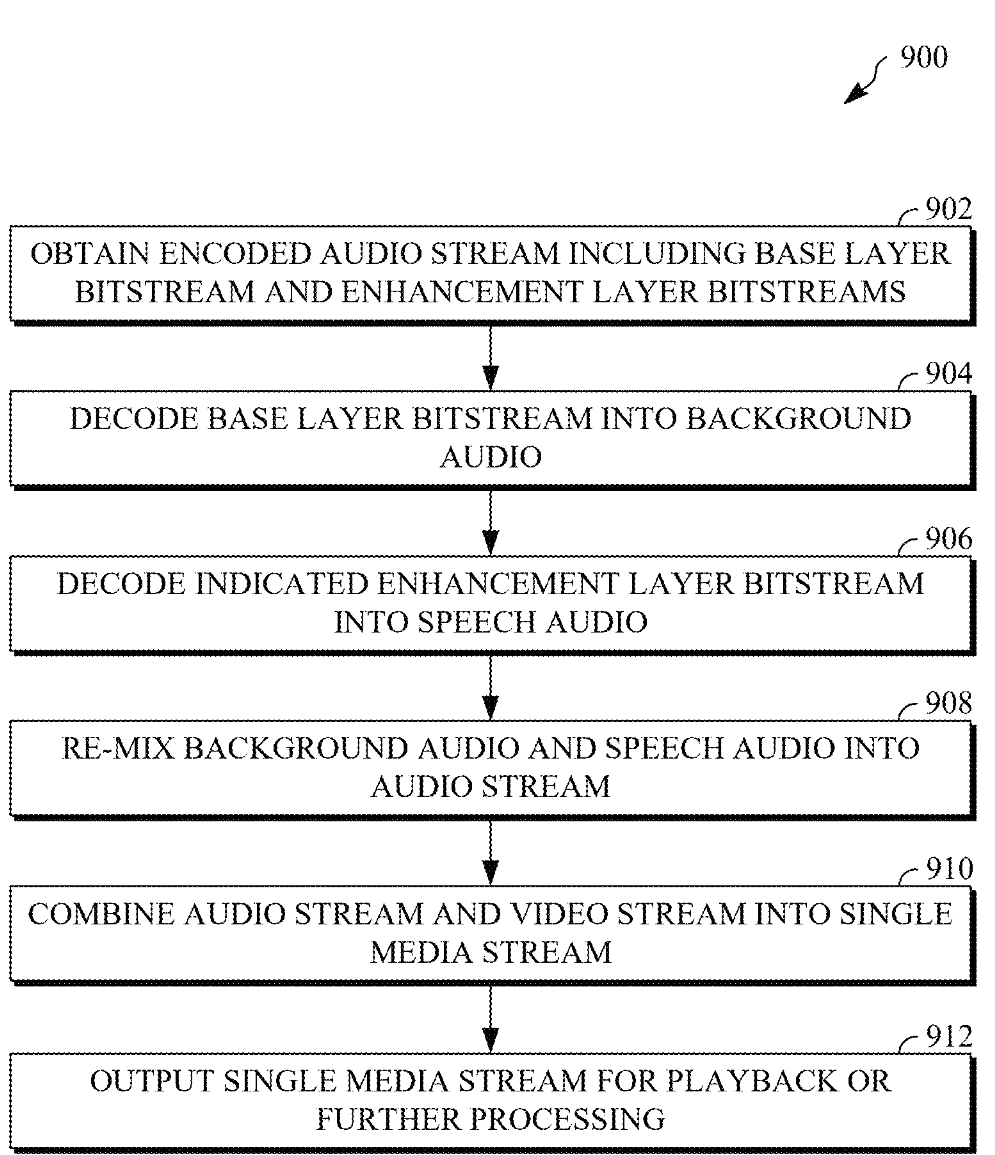
FIG. 9 is a flowchart diagram of an example of a technique for multi-format single stream scalable decoding for multi-language audio.

Further details of techniques for multi-format single stream scalable coding for multi-language audio are now described. FIG. 8 is a flowchart diagram of an example of a technique 800 for multi-format single stream scalable encoding for multi-language audio. FIG. 9 is a flowchart diagram of an example of a technique 900 for multi-format single stream scalable decoding for multi-language audio.

The technique 800 and/or the technique 900 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800 and/or the technique 900. The technique 800 and/or the technique 900 can be implemented using specialized hardware or firmware. For example, a hardware component configured to perform the technique 800 and/or the technique 900. As explained above, some computing devices may have multiple memories or processors, and the operations described in the technique 800 and/or the technique 900 can be distributed using multiple processors, memories, or both.

For simplicity of explanation, the technique 800 and the technique 900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for multi-format single stream scalable encoding for multi-language audio is shown. At 802, audio of an input video stream is separated into background audio and speech audio. For example, the background audio may include non-speech background audio and/or speech background audio, the latter of which may be diegetic speech or non-diegetic speech. Similarly, the speech audio may correspond to one or both of diegetic speech or non-diegetic speech. The input video stream may, for example, be an input video stream uploaded to an online video platform. For example, the input video stream may be obtained from a first device, such as a video upload device. In some cases, separating the audio of the input video stream uploaded to the online video platform into the background audio and the speech audio may include performing blind audio source separation against the audio of the input video stream. In one particular example, performing the blind audio source separation against the audio of the input video stream may include using a machine learning model trained for speech and speaker identification to perform the blind audio source separation.

At 804, the speech audio is converted into multiple language versions, such as from a first language in which the speech audio is originally captured to one or more other languages including at least a second language. The speech audio may be converted using manual, semi-automated, or automated approaches. For example, converting the speech audio into the multiple language speech audio versions may include converting the speech audio into text, translating the text into each of multiple languages, and converting, for each of the multiple languages, the translated text into one of the multiple language speech audio versions. In another example, converting the speech audio into the multiple language speech audio versions may include using a large language model trained for speech audio conversion to directly translate the speech audio into each of the multiple language speech audio versions.

At 806, the background audio is encoded to a base layer bitstream. At 808, each language version of the speech audio is encoded to a different enhancement layer bitstream. The encodings of the background audio and the multiple language versions of the speech audio are according to a scalable video coding schema using base and enhancement layers.

At 810, the base layer bitstream, enhancement layer bitstreams, and other data are combined into (e.g., to produce) an encoded audio stream. The other data includes language selection precedence data determined according to a prioritization of the multiple language speech audio versions encoded to the enhancement layer bitstreams. For example, combining, into the encoded audio stream, the base layer bitstream, each of the enhancement layer bitstreams, and the language selection precedence data for the enhancement layer bitstreams may include embedding the language selection precedence data within metadata of the encoded audio stream or within supplemental enhancement information within the encoded audio stream. The language selection precedence data indicates, to a decoder, an enhancement layer bitstream of the encoded audio stream to decode for playback of the input video stream.

At 812, the encoded audio stream is output for storage or further processing. For example, the encoded audio stream may be stored within a bitstream data store associated with an online video platform from which the encoded audio stream may later be obtained by a playback device for rendering along with a video component.

Referring next to FIG. 9, the technique 900 for multi-format single stream scalable decoding for multi-language audio is shown. At 902, an encoded audio stream including a base layer bitstream and enhancement layer bitstreams is obtained. The enhancement layer bitstreams each correspond to a different language version of speech audio. The encoded audio stream also includes language selection precedence data indicating prioritizations of audio language tracks associated with the enhancement layer bitstreams. For example, the language selection precedence data may be or include metadata or supplemental enhancement information.

At 904, the base layer bitstream is decoded into background audio. At 906, an indicated enhancement layer bitstream is decoded into speech audio. The indicated enhancement layer bitstream is an enhancement layer bitstream indicated by the language selection precedence data. For example, decoding the enhancement layer bitstream indicated by the language selection precedence data into the speech audio may include reading the language selection precedence data from metadata of the encoded audio stream or supplemental enhancement information within the encoded audio bitstream, and determining a priority language for the audio stream based on the language selection precedence data, wherein the enhancement layer bitstream corresponds to the priority language.

At 908, the background audio and the speech audio are re-mixed into an audio stream. For example, re-mixing the background audio and the speech audio into the audio stream can include re-mixing all of the background audio and the speech audio or performing such re-mixing on a chunk-basis. For example, re-mixing the background audio and the speech audio on a chunk-basis may include re-mixing a first chunk of the background audio and a first chunk of the speech audio in a first language into a first audio stream chunk. Where a language change occurs during playback, a second chunk of the background audio and a second chunk of the speech audio in a second language may be re-mixed into a second audio stream chunk. For example, a different enhancement layer bitstream may be decoded based on a selection, at a playback device to which the single media stream is output, of the second language.

At 910, the audio stream is combined (e.g., transmuxed) with a decoded video stream into (e.g., to produce) a single media stream. At 912, the single media stream is output for playback or further processing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:

separating audio of an input video stream uploaded to an online video platform into background audio and speech audio;

converting the speech audio into multiple language speech audio versions;

encoding the background audio to a base layer bitstream;

encoding each of the multiple language speech audio versions to a different enhancement layer bitstream, wherein each of the different enhancement layer bitstreams represents the speech audio in one of multiple different languages;

combining, into an encoded audio stream, the base layer bitstream, each of the enhancement layer bitstreams, and language selection precedence data for the enhancement layer bitstreams, wherein the language selection precedence data is embedded within a header of the encoded audio stream; and outputting the encoded audio stream for storage or further processing.

2. The method of claim 1, wherein separating the audio of the input video stream uploaded to the online video platform into the background audio and the speech audio comprises:

performing blind audio source separation against the audio of the input video stream.

3. The method of claim 2, wherein performing the blind audio source separation against the audio of the input video stream comprises:

using a machine learning model trained for speech and speaker identification to perform the blind audio source separation.

4. The method of claim 1, wherein converting the speech audio into the multiple language speech audio versions comprises:

converting the speech audio into text;

translating the text into each of the multiple different languages; and converting, for each of the multiple different languages, the translated text into one of the multiple language speech audio versions.

5. The method of claim 1, wherein converting the speech audio into the multiple language speech audio versions comprises:

using a large language model trained for speech audio conversion to directly translate the speech audio into each of the multiple language speech audio versions.

6. The method of claim 1, comprising:

determining the language selection precedence data according to a prioritization of the multiple language speech audio versions.

7. The method of claim 6, wherein combining, into the encoded audio stream, the base layer bitstream, each of the enhancement layer bitstreams, and the language selection precedence data for the enhancement layer bitstreams comprises:

embedding the language selection precedence data within metadata of the encoded audio stream or within supplemental enhancement information within the encoded audio stream.

8. The method of claim 6, wherein the language selection precedence data indicates, to a decoder, an enhancement layer bitstream of the encoded audio stream to decode for playback of the input video stream.

9. The method of claim 1, wherein the speech audio corresponds to one or both of diegetic speech or non-diegetic speech.

10. The method of claim 1, wherein the background audio is encoded to the base layer bitstream using a first audio channel format and the speech audio is encoded to the enhancement layer bitstreams using a second audio channel format.

11. A method, comprising:

obtaining an encoded audio stream including a base layer bitstream, multiple enhancement layer bitstreams each representing speech audio of an input video stream used to produce the encoded audio stream in one of multiple different languages, and language selection precedence data embedded within a header of the encoded audio stream;

decoding, from the audio stream, the base layer bitstream into background audio;

decoding, from the audio stream, an enhancement layer bitstream indicated by the language selection precedence data into speech audio;

re-mixing the background audio and the speech audio into an audio stream;

combining the audio stream and a video stream into a single media stream; and outputting the single media stream for playback or further processing.

12. The method of claim 11, wherein decoding the enhancement layer bitstream indicated by the language selection precedence data into the speech audio comprises:

reading the language selection precedence data from metadata of the encoded audio stream or supplemental enhancement information within the encoded audio bitstream; and determining a priority language for the audio stream based on the language selection precedence data, wherein the enhancement layer bitstream corresponds to the priority language.

13. The method of claim 12, comprising:

decoding, from the audio stream, a different enhancement layer bitstream for playback within the single media stream, wherein the enhancement layer bitstream corresponds to a first language version of the speech audio and the different enhancement layer bitstream corresponds to a second language version of the speech audio.

14. The method of claim 13, wherein re-mixing the background audio and the speech audio into the audio stream comprises:

re-mixing a first chunk of the background audio and a first chunk of the speech audio in the first language into a first audio stream chunk, and wherein the method comprises:

re-mixing a second chunk of the background audio and a second chunk of the speech audio in the second language into a second audio stream chunk.

15. The method of claim 13, wherein the different enhancement layer bitstream is decoded based on a selection, at a playback device to which the single media stream is output, of the second language.

16. The method of claim 11, wherein multiple enhancement layer bitstreams are decoded into different audio speech versions according to the language selection precedence data and the different audio speech versions are re-mixed with the background audio.

17. A system, comprising:

one or more servers used with an online video platform and configured to:

obtain an input video stream from a first device;

encode background audio of the input video stream to a base layer bitstream;

encode each of multiple language versions of speech audio of the input video stream to a different enhancement layer bitstream, wherein each of the different enhancement layer bitstreams represents the speech audio in one of multiple different languages;

combine, into an encoded audio stream, the base layer bitstream, each of the enhancement layer bitstreams, and language selection precedence data for the enhancement layer bitstreams, wherein the language selection precedence data is embedded within a header of the encoded audio stream; and output the encoded audio stream for decoding at a second device responsive to a playback request for a video associated with the encoded audio stream, wherein the encoded audio stream configures the second device to decode one of the enhancement layer bitstreams for playback of a language version of the speech audio along with the background audio according to the language selection precedence data.

18. The system of claim 17, wherein the one or more servers are configured to:

separate audio of the input video stream into the background audio and the speech audio; and convert the speech audio into the multiple language versions of the speech audio.

19. The system of claim 17, wherein the language selection precedence data is embedded within metadata of the encoded audio stream or within supplemental enhancement information within the encoded audio stream.

20. The system of claim 17, wherein the language selection precedence data is determined according to a prioritization of the multiple language versions of the speech audio.

* * * * *